United States Patent [19]

Oschman et al.

[11] Patent Number: 5,778,591
[45] Date of Patent: Jul. 14, 1998

[54] METHOD AND APPARATUS FOR TEMPORARILY DEBILITATING TUNA AND OTHER FISH TO FACILITATE CAPTURE

[75] Inventors: James L. Oschman; Nora H. Oschman, both of Dover, N.H.; Keith E. Sommer, Satellite Beach, Fla.

[73] Assignee: Nature's Own Research Association, Dover, N.H.

[21] Appl. No.: 779,426

[22] Filed: Jan. 7, 1997

Related U.S. Application Data

[63] Continuation of Ser. No. 306,875, Sep. 15, 1994.

[51] Int. Cl.$^6$ .............................. H04B 1/02; A01K 79/02
[52] U.S. Cl. .................................... 43/17.1; 43/4; 43/9.2
[58] Field of Search ............................................. 43/17.1

[56] References Cited

U.S. PATENT DOCUMENTS

| | | | |
|---|---|---|---|
| 2,977,705 | 4/1961 | Busnel | 43/17.1 |
| 3,105,233 | 9/1963 | D'Amore et al. | 43/17.1 |
| 3,177,465 | 4/1965 | Wyatt | 43/17.1 |
| 3,414,873 | 12/1968 | Richard et al. | 43/17.1 |
| 3,885,338 | 5/1975 | York | 43/17.1 |
| 3,909,973 | 10/1975 | Fairbanks | 43/42.31 |
| 4,646,276 | 2/1987 | Kowalewski et al. | 367/139 |
| 4,805,339 | 2/1989 | Fuentes et al. | 43/42.31 |
| 4,922,468 | 5/1990 | Menezes | 367/139 |
| 4,932,007 | 6/1990 | Suomala | 367/139 |
| 4,951,410 | 8/1990 | Ly | 43/17.1 |
| 4,955,005 | 9/1990 | Loeffelman | 367/139 |
| 5,046,278 | 9/1991 | Szilagyi et al. | 43/17.1 |
| 5,117,572 | 6/1992 | Parra | 43/17.1 |
| 5,134,592 | 7/1992 | Parra | 367/139 |
| 5,177,891 | 1/1993 | Holt | 43/17.1 |
| 5,289,133 | 2/1994 | Kolz | 43/17.1 |
| 5,291,682 | 3/1994 | Zaccheo | 43/17.1 |
| 5,327,668 | 7/1994 | Sharber | 43/17.1 |

OTHER PUBLICATIONS

Norris, K.J. & Mohl, B., "Can Odontocetes Debilitate . . . " The American Naturalist, vol. 122.No. 1, 1983. (pp. 85–104).

Beardsley, T.M., "Sonic Punch. Dolphins and whales . . . " Scientific American, vol. 257, No. 4, 1987. (p. 36).

Norris, K. & Marten, K., "Hearing could be herring's red herring" (summary), Science News, vol. 130, 1986 p. 238.

Van Bergeijk, W., "The Evolution of Vertebrate Hearing" from Contributions to Sensory Physiology Edited by W.D. Neff. vol. 2, pp. 1–49, Academic Press, New York, 1967.

Pumphrey, P.J., "Hearing", from the Symposia of the Society for Experimental Biology. vol. 4, pp. 3–18, 1950.

Hawkins, A.D. & MacLennan, D.N., "An acoustic tank for hearing studies on fish" from Schuijf, A. & Hawkins, A.D. Editors (1976) Sound Reception in Fish pp. 149–169.

Popper, A.N. & Platt, C., "Inner ear and lateral line." Ch. 4 in *The Physiology of Fishes* (pp. 99–136). Edited by D.H. Evans. CRC Press, Boca Raton, Florida.

Gormley, G. *Orcas of the Gulf. A Natural History.* Sierra Club Books, San Francisco, 1990, pp. 96–99;174–177; & 192–193.

Prior, K. & Norris, K.S., "The Tuna/Porpoise Problem: Behavioral Aspects" taken from Oceanus 1978. pp. 31–37.

Norris, K.S.; Stuntz, W.E. & Rogers, W., "The Behavior of Porpoises and Tuna in the Eastern Tropical Pacific Yellowfin Tuna Fishery—Preliminary Studies" Report No. MMC–76/12, final report to the U.S. Marine Mammal Commission. National Tech. Inform. Service PB283–970 (1978).

(List continued on next page.)

*Primary Examiner*—Joseph J. Hail, III
*Assistant Examiner*—Anthony Ojini
*Attorney, Agent, or Firm*—Hayes, Soloway, Hennessey, Grossman & Hage, P.C.

[57] ABSTRACT

Tuna are separated from dolphins who often travel together by temporarily stunning the tuna and allowing the dolphins to continue on course. The tuna stunning is accomplished by creating underwater sounds of a selected frequency range which has a maximum impact on the tuna and a minimum impact on the dolphins.

17 Claims, 6 Drawing Sheets

OTHER PUBLICATIONS

Stunz, W.E. & Shay, T.B., "Report on Capture Stress Workshop" Admin. Report No. LJ-79-28, Southwest Fisheries Center, National Marine Fisheries Service, La Jolla, CA 92088. (1979).

Payne, R. & Webb, D., "Orientation by means of long range acoustic signaling in baleen whales" taken from the Annals of the New York Academy of Sciences. 18:110-142. (1971).

Cahn, P.H., "Lateral line detectors", p. 226, Indiana University Press, Bloomington, Indiana, 1967.

de Vries, H., "Physical aspects of the sense organs", taken from Progress in Biopysics and Biophysics and Biophysical Chemistry. vol. 6, pp. 207-264. (1956).

Iverson, R.T.B., "Response of Yellowfin Tuna (Thunnus albacares) to Underwater Sound". In *Marine Bio-Acoustics*, edited by W.N. Travolga. vol. 2, pp. 105-121, Pergamon, Oxford, 1966.

"Progress in 1964-1965 at the Bureau of Commercial Fisheries Biology Laboratory, Honolulu" 6-7. United States Department of the Interior, Washington, D.C., Feb. 1966.

Johnson, C.S., pp. 247-260 in *Marine Bio-Acoustics*, edited by W.N. Tavolga. vol. 2, Pergamon, New York. (1968).

Schevill, W.E.; Watkins, W.A. & Backus, R.H., "The 20-cycle signals and Balaneoptera (Fin whales)." In *Marine Bio-Acoustics*, Edited by W.N. Tavolga. pp. 147-152, Pergamon Press, New York, 1964.

Van Bergeijk, "Discussion of Critical Bands in Hearing of Fishes", taken from *Marine Bio-Acoustics*, Edited by W.N. Tavolga. vol. 2, pp. 243-245, Pergamon Press, Oxford, 1967.

Patterson, B. & Hamilton, G.R., "Repetitive 20 cysle per second biological hydroacoustic signals at Bermuda." In *Marine Bio-Acoustics* edited by W.N. Tavolga, pp. 125-146, Pergamon Press, New York, 1964.

Matthews, L.H., *The Whale*. pp. 242-263, Crescent Books, New York, 1975.

Offutt, C.G., "A proposed mechanism for the perception of acoustic stimuli near threshold" taken from the Journal of Auditory Research. vol. 10, pp. 226-230. (1970).

FREQUENCIES IN Hz

←——————— 0.1 SEC.———————→

METHOD AND APPARATUS FOR TEMPORARILY DEBILITATING TUNA AND OTHER FISH TO FACILITATE CAPTURE

This is a continuation of copending application Ser. No. 08/306,875 filed on Sep. 15, 1994.

FIELD OF THE INVENTION

This invention pertains to systems, methods and devices for debilitating tuna and other fish to facilitate their capture by purse seining and other methods. We define "debilitation" as a temporary condition of weakness or disorientation or stunning that does not cause permanent damage, incapacitate, or reduce the food value of the fish. One application is in preventing schoolfish from escaping purse seine nets prior to pursing. Another application is in the separation of tuna from dolphins and other marine mammals that may travel with them. Scientific, public, and legislative awareness of the ecological consequences of commercial tuna fishing has led to an increasing need for methods of separating tuna and dolphins. It will be appreciated that a reliable and effective method of separating tuna and dolphins prior to encirclement with purse seine nets would have constructive applications in the world tuna fishery. This method would temporarily debilitate tuna. Because pods of dolphin normally travel rapidly through the water, any effect that slows the tuna, even temporarily, will cause the tuna to be left behind so they can be encircled and harvested without harassing or endangering dolphins or other marine mammals.

BACKGROUND ART

The capture of fish, including pelagic species such as tuna, presents a number of technological problems because it is difficult to control the behavior of fish and prevent their escape from nets or other capture systems. The capture of schoolfish ("breezers," "foamers," or "boilers") with purse seine nets is problematic because fish may escape under the net prior to pursing, requiring that the net be hauled back onto the seiner and re-set. A reliable and effective method of temporarily slowing the movement of schoolfish and thereby slowing, delaying, or preventing their escape from nets prior to pursing would be advantageous because it would increase the speed and efficiency of fishing operations and reduce wear and tear on personnel and equipment.

Tuna fishermen have particular difficulty separating dolphins from tuna that travel with them in certain oceanic regions. Modern purse seining technology is, in essence, a system for breaking the tuna-dolphin bond. While many improvements have been made in the art, present purse seining is difficult, complex, dangerous to fisherman, and still results in a significant dolphin bycatch.

Well known in the prior art are various devices and methods for attracting, luring, or repelling fish. Some prior art has an object of frightening dolphins away from fish or from tuna nets.

It has long been known that fish are able to detect and respond to underwater sounds. Fish detect vibrations with a specialized skin organ known as the lateral line, and with an inner ear consisting of otolith granules and sensory hair cells connected to cranial nerves. While physiologists are not in complete agreement, it is widely held that the lateral line is primarily a receptor for low frequency vibrations such as those produced by hydrodynamic waves, displacements, currents, flows around obstacles, movement of nearby fish or prey, or reflections from nearby objects of the flow fields generated by the swimming of the fish itself. The intensity of such displacement waves drops off as the cube of the distance, limiting the effective range of the lateral line detector to approximately the length of the body of the receiver. In contrast, propagated pressure waves are the phenomena that most physiologists consider to be "sound" and their detection to be "hearing". Their intensity decreases as the square of the distance from the source. For a detailed discussion of these points, see Van Bergeijk (1967) 'The Evolution of Vertebrate Hearing" In "Contributions to Sensory Physiology" Edited by W. D. Neff Vol. 2, pp. 1–49, Academic Press, New York; and Van Bergeijk (1967) "Discussion of Critical Bands in Hearing of Fishes" in "Marine Bio-Acoustics" Edited by W. N. Tavolga Vol. 2, pp. 244–245, Pergamon Press, Oxford. The pressure wave or sound detector in fish is thought to be the inner ear with it's otoliths and sensory hair cells. Otoliths are calcarious bodies that lie on a bed or macula composed of sensory hair cells within the labyrinth of the inner ear. The labyrinth is a system of three semicircular canals laying at mutual right angles to each other. The fish labyrinth and associated otoliths are the evolutionary precursor of the mammalian vestibular system, an organ of balance. The bulk of the tissues in fish are essentially transparent to water-bourne sound. In a sound field, most of the tissues vibrate at approximately the same amplitude and phase as the surrounding water particles. For a discussion of these points, see Pumphrey, P. J. (1950) "Hearing" Symposia of the Society for Experimental Biology Volume 4, pages 3–18; de Vries, H. (1956) "Physical aspects of the sense organs" Progress in Biophysics and Biophysical Chemistry Volume 6 pages 207–264; and the work of Van Bergeijk cited above. Sound reception requires the presence of a transducer that has very different acoustic properties and density from the water and other tissues. The otolith and the swimbladder are good candidates for this. Each otolith has a resonant frequency that depends upon its size, geometry, and composition. When a sound at the otolith's resonant frequency passes through the tissues of the fish, the otolith vibrates more strongly than the surrounding tissues, thereby creating periodic shearing forces at the macula and stimulating the sensory hair cells. For a discussion of these points, see Hawkins, A. D. and D. N. MacLennan (1976) "An Acoustic Tank for Hearing Studies on Fish." From Schuijf, A. and A. D. Hawkins, Editors (1976) "Sound Reception in Fish." For a detailed discussion of these points and references to the earlier literature, see Popper, A. N. and C. Platt, 1993. "Inner ear and lateral line." Chapter 4 in *The Physiology of Fishes*, edited by D. H. Evans, CRC Press, Boca Raton, Fla., p. 99–136. An alternative theory is that the otoliths have piezoelectric properties, and the hair cells are electrical receptors. For a discussion of this point, see Offutt, C. G. (1970) "A proposed mechanism for the perception of acoustic stimuli near threshold" Journal of Auditory Research Volume 10, pages 226–230. In some, but not all fish species, the labyrinth is connected to the swimbladder via ossicles which are comparable to the middle ear bones of mammals. Therefore in such fish the swimbladder acts as an accessory hearing organ. Many pelagic fish including tuna lack swimbladders.

Less well known is the fact that many odontocetes (toothed whales, including dolphins) appear to be able to debilitate moving prey to facilitate their capture. Research suggests that the most logical explanation of this phenomenon is that the odontocetes produce intense sounds that stun and thereby debilitate their prey, making capture easier. Research has indicated that components of the odontocete echlocation system have evolved in a manner that permits the production and focusing of intense sounds that can temporarily stun fish, squid, and other prey.

The mechanism may involve the production in the prey of intense oscillations of otolith granules which then stimulate the sensory hair cells and cranial nerves, leading to a temporary "sensory overload" condition and disorientation. For a detailed discussion of acoustic prey debilitation, see Norris, K. J. and B. Møhl (1983) "Can Odontocetes Debilitate Prey With Sound?" in The American Naturalist Volume 122, Number 1, pages 85–104.

In 1986, Norris and Marten reported that the frequency of sounds recorded from killer whales during hunting sessions had a remarkable correlation with the range of hearing sensitivity of herring, a favored prey. The whales emitted sounds in the 400 Hz frequency range, exactly at the peak of the herring's hearing sensitivity. Marten suggested that the fish rely on hearing for navigation in cloudy waters, and the intense sound of the whales might confuse their prey, making them "sitting ducks" for the killer whales. Norris and Marten named this hypotheses the "big bang theory."

In 1987, Virginia L. Cass (see T. M. Beardsley, 1987. *Sonic punch. Dolphins and whales generate "bangs" that may stun prey*. Scientific American 257(4):36) found that wild bottle-nosed dolphins and killer whales produce banging noises while they are feeding. Her tape recordings of the bangs showed that they are much lower in frequency than the clicks used in echolocation. The bangs coincide with the hearing range of the prey and last 1000 times longer than echolocation clicks. The sound is similar to that of a gun firing or a stun grenade exploding.

The prey stunning mechanism may involve a process that Norris had already suggested in the early 1970's (see Matthews, L. H., 1975. *The Whale*, New York, Crescent Books, page 259). At that time, Norris suggested that dolphin echolocation signals are not only reflected by some objects, but may resonate with them, or cause them to "ring." This suggestion is based on the well documented principle that objects tend to resonate when bombarded with sufficient energy tuned to their natural frequency. Since the resonant frequency of an object depends on its size, geometry, and composition, this ringing might help the cetaceans identify the objects they sonar. This could, for example, account for the demonstrated ability of dolphins to discriminate between different metals and other materials with their sonar.

In 1990, naturalist Gerard Gormley reviewed the literature summarized above and added a suggestion of his own (Gormley, G., 1990. *Orcas of the gulf*. A natural history, Sierra Club Books, San Francisco). He hypothesized what he calls "ring-tone scanning." Gormley suggested that orcas memorize the critical pitch for each of their prey species, but that this pitch shifts as the animals grow and age. Orcas therefore scan the acoustic spectrum, searching for the exact frequency at which their particular prey hear best. The orcas then bombard the fish with intense signals at that frequency and disorient or stun them.

Since the orcas must still use their sonar to track their prey, Gormley suggests they emit a combined sonar/stunning sound which consists of a pulse-modulated frequency.

Because of the tendency for sound to be dissipated in the water, Gormley suggests that the orcas are able to focus sound one their prey, and that ring-tone scanning probably confuses the prey at a distance, while stunning it at close range.

Gormley's suggestions are purely speculative, but they are by no means preposterous, considering all of the information presented above. Moreover, Gormely's ideas are supported by what: is known about hearing in fish.

In addition to the extensive literature discussed above there are a number of U.S. Patents which use under water sounds in various schemes for attracting or repelling fish. The following list contains the most pertinent of such art.

| | | | |
|---|---|---|---|
| 2,977,705 | 4/1961 | Busnell | 43/17.1 |
| 3,105,233 | 9/1963 | D'Amore et al | 340–394 |
| 3,177,465 | 4/1965 | Wyatt | 340-5 |
| 3,414,873 | 12/1968 | Richard | 340-5 |
| 3,885,338 | 5/1975 | York | 43/17.1 |
| 3,909,973 | 10/7/75 | Fairbanks | 43/42.31 |
| 4,646,276 | 2/24/87 | Kowalewski et al | 367/139 |
| 4,805,339 | 2/1989 | Fuentes et al | 43/42.31 |
| 4,922,468 | 5/1990 | Menezes | 367/139 |
| 4,932,007 | 6/1990 | Suomala | 367/139 |
| 4,951,410 | 8/1990 | Ly | 43/17.1 |
| 4,955,005 | 9/1990 | Loeffelman | 367/139 |
| 5,046,278 | 9/1991 | Szilagyi et al | 43/17.1 |
| 5,117,572 | 6/1992 | Parra | 43/17.1 |
| 5,134,592 | 7/1992 | Parra | 367/139 |
| 5,177,891 | 1/1993 | Holt | 43/17.1 |

A limitation of these and other prior art devices is that while they produce underwater sounds or other signals purported to alter the behavior of fish or of dolphins, they have generally lacked adequate effectiveness to be of value in commercial fishing operations directed at fish in schools and in schools associated with marine animals. One apparent reason is that there is a great deal of noise present during fishing operations. Such noise arises from the fishing operation (engines and other equipment on seiners, speedboats, skiffs, helicopters, etc.) and from the feeding frenzy, turbulence and foaming at the water surface, and other sounds produced by the fish themselves and by birds, marine mammals, and other species engaged in the feeding frenzy. Such noise masks the acoustic stimuli intended to attract or repel fish.

A deficiency apparent in the prior art for separating tuna and dolphins by use of killer whale sounds (note that "killer whales" are, in fact, large dolphins, *Orcinus orca*) is that studies have shown that dolphins are already frightened, stressed, and confused by sounds of speedboats and other purse seine equipment. Note that the first step in present purse seine art is a high speed chase in which dolphins are herded together into a confined area that is then encircled with a net. Once physiological systems are extremely stressed or agitated (sensory overload) there is a tendency to become passive and insensitive to further stimulation. Biologists have noted specific behaviors exhibited by dolphins during purse seine fishing that are indicative of stress and/or attempts to avoid stressful or painful behavior; and vertical orientation behavior, in which the dolphin's ears are pushed above the water surface. Therefore, the addition of frightening sounds from killer whales has little or no effect. For a detailed discussion of dolphin behavior during purse seining, see Norris, K. S., W. E. Stuntz, and W. Rogers (1978) "The Behavior of Porpoises and Tuna in the Eastern Tropical Pacific Yellowfin Tuna Fishery—Preliminary Studies" Report No. MMC-76/12, final report to the U.S. Marine Mammal Commission in fulfillment of contract MM6AC022. National Technical Information Service PB 283-970; and Prior, K. and K. S. Norris (1978) "The Tuna/Porpoise Problem: Behavioral Aspects" Oceanus 31–37. For a detailed discussion of "capture stress" and "capture myopathy" as they apply to marine mammals, see Stuntz, W. E. and T. B. Shay (1979) "Report on Capture Stress Workshop" Administrative Report LJ-79-28. Southwest Fisheries Center, National Marine Fisheries Service, La Jolla, Calif. 92038.

A second deficiency apparent in the use of killer whale sounds is that while killer whale sounds might be used to frighten dolphins away from an area without using a high speed speedboat chase, it is well known that the tuna can and do follow the dolphins, even when dolphins move at high speed.

A third deficiency apparent in the use of killer whale sounds is that dolphins are very intelligent and have acute auditory discrimination and memory which enables them to quickly learn the difference between the sounds of real killer whales and artificial sounds introduced into the water when no killer whales are actually present. While the dolphins may be "fooled" a few times, they will quickly learn to recognize the artificial killer whale sounds and ignore them, rendering such artificial killer whale sounds ineffective in separating tuna and dolphins.

Finally, the Marine Mammal Protection Act discourages the use of any art that stresses dolphins, whales, or other marine mammals.

It is an object of the present invention to provide an effective and reliable method for controlling the behavior of fish, and in particular tuna, such method being harmless to dolphins and/or other marine mammals that may associate with such fish.

It is also an object to provide a method of testing the effectiveness of various natural and artificially generated stimuli for their effects on fish, and in particular tuna, with the aim of finding signals that are effective in stunning or otherwise temporarily debilitating fish.

It is also an object to provide a method of introducing such effective stimuli into the water to facilitate the capture of fish, and in particular tuna, during commercial or other fishing operations in a manner which slows, reduces, or eliminates the tendency of such fish to escape capture. In cases where such fish are associated with marine mammals, it is an object to provide a means for separating such fish from associated marine mammals without harm or harassment to such marine mammals.

It is also an object to identify or develop signals that will stun only the larger sexually mature tuna, thereby avoiding capture in nets of young, immature fish that are normally discarded. It will be appreciated that this would have constructive advantages in managing and preserving the tuna fishery and enhancing the yield per recruit.

A still further object is to provide a practical apparatus with sufficient power to overcome background noises generated by activities of fish, surface sounds, and/or fishing vessels and gear.

A still further object is to describe other applications of this art, such as the debilitation of fish in aquaria to facilitate their capture, separation, or veterinary treatment.

SUMMARY OF THE INVENTION

These and other problems of the prior art are overcome and the objectives listed above are achieved in the present invention by the underwater reproduction of acoustical signals demonstrated to temporarily debilitate predetermined species of fish. In contrast to the prior art, the reproduced signals need not necessarily be naturally occuring signals, such as those produced by surface weather disturbances, motions of surface bait, underwater sounds produced by fish, sounds associated with feeding, struggling, reproduction, or killer whale sounds. The frequencies of the reproduced signals are selected to be in the range of peak sensitivity for a predetermined species of fish, and are far away from the peak sensitivity of dolphins or other marine mammals. The effectiveness of this invention in this respect is a consequence of the difference in hearing mechanisms and hearing frequency range of fish compared to marine mammals. The present invention accordingly represents a distinct advance over prior art acoustical systems which are designed to attract or repel fish or to frighten dolphins.

In accordance with this invention, a device for developing debilitating sounds includes a sound source such as an acoustical transducer, and electrical or electronic circuitry and/or mechanical mechanisms for generating, recording, and reproducing a wide range of acoustical signals, both natural and artificially generated, and means for testing such signals for their influence on fish behavior. In accordance with one aspect of the invention, information representative of sounds that stun or otherwise debilitate fish are created with a signal and/or pulse generator or by other means, are stored in a computer memory device, read-only memory chip, or tape recorder, and are projected underwater by converting the stored sounds into intense acoustical signals by means of electrical or electronic circuitry and one or more underwater transducers or other sound producing devices.

BRIEF DESCRIPTION OF THE DRAWINGS

For a more complete understanding of the features, advantages, and objects of the invention, reference should be made to the following detailed description and the accompanying drawings, in which.

DETAILED DESCRIPTION OF THE PREFERRED EMBODIMENTS

With reference now to the drawings, and in particular to FIG. 1 to 12 thereof, there is described a new method and apparatus for temporarily stunning, disorienting, or otherwise debilitating tuna and other fish to facilitate capture and/or separation from associated marine mammals, particularly dolphins.

Figure 1:
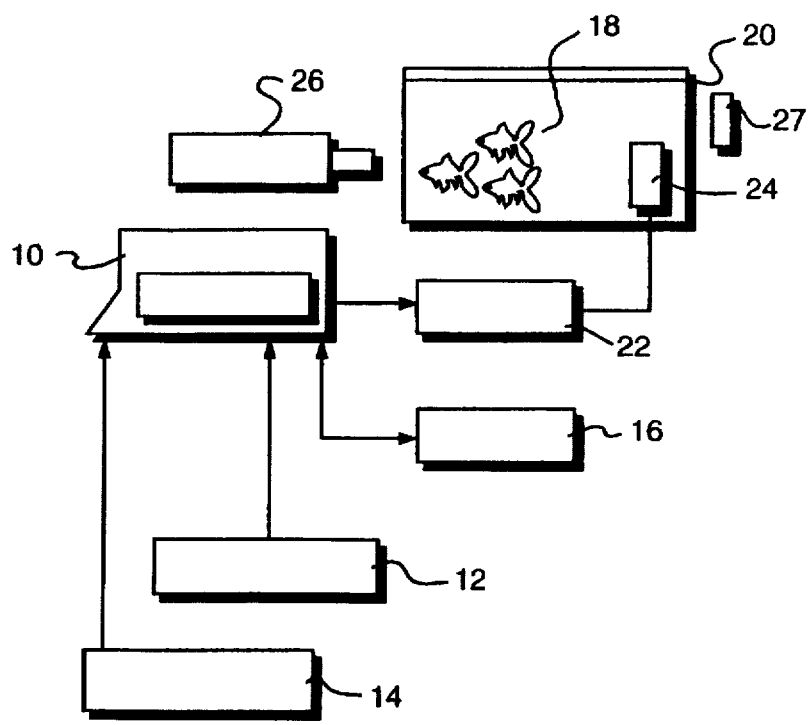
FIG. 1 is a block diagram illustrating a means of creating, editing, and recording sounds and for testing them for their effectiveness in stunning, disorienting, or otherwise debilitating fish.

FIG. 1 is an illustrative embodiment of a means of creating, editing, and recording sounds and testing them for their effectiveness in stunning, disorienting, or otherwise debilitating fish. The illustrative embodiment consists of a computer 10 (e.g., MacIntosh Portable) with sound editing hardware and software (e.g., MacRecorder microphone/ digitizer and SoundEdit software). Single or multiple signals of particular frequencies, pulse widths, and wave forms can be created with the software; or signals can be created with a signal generator 12 and introduced into the computer. Equally, signals can be introduced into the computer and software via a microphone 14. Alternatively, natural signals recorded in the field can be played back in a recorder 16 and introduced into the computer. With the sound editing software in the computer 10, the signals can be edited and stored in the computer memory (or on disk or tape) for testing for their observable influence on the behavior of fish 18 in a test tank 20. With the sound editing software, complex signals can be broken into segments which can be tested separately to see which component has the most significant or desirable influence on fish behavior.

Testing is accomplished by reading the edited and stored signals into a power amplifier 22 (e.g., Realistic MPA-30 20 watt P.A. amplifier). The power amplifier is connected to an underwater speaker or transducer or other sound producing device 24 (e.g., University UW-30 Diatran Underwater Loudspeaker) in the fish tank 20. The transducer 24 injects the test signal into the water containing fish. Behavior of the fish can be observed and can also be recorded with a camera or a video camera 26. The duration of behavioral effects can be measured by frame-by-frame study of films or video images with reference to a digital clock, which indicates elapsed time in hundredths of a second, or with reference to the duration of individual frames (for example, at a shutter speed of 30 frames per second, each frame represents $\frac{1}{30}$ of a second). Sounds effective in stunning, disorienting, or otherwise debilitating fish can be stored on the computer disk or recorded on the tape recorder. By this means signals can be obtained that have the desired predetermined effects on fish behavior. The sound editing software also provides for spectral analysis of selected signals.

Figure 2:
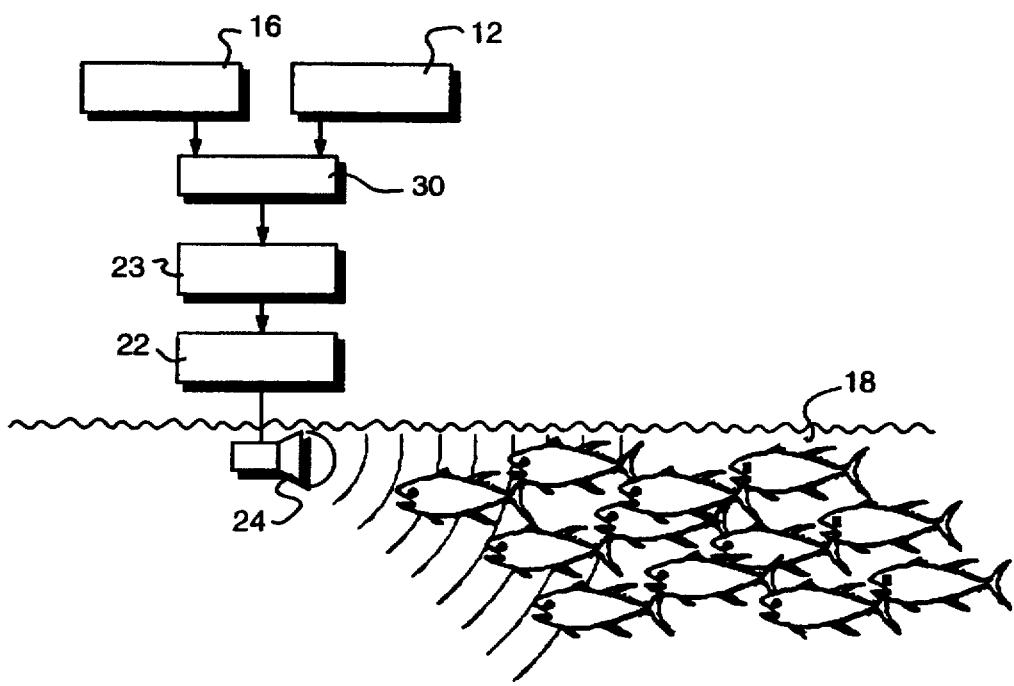
FIG. 2 is a block diagram illustrating a means introducing effective stimuli into the water to facilitate the capture of fish.

FIG. 2 illustrates schematically an embodiment of a system for injecting stunning signals into the water to influence behavior of a predetermined species of fish 18. A tape recorder 16 (e.g., Prospec Shipmate System, Model PC-6263), or signal generator 12, or other signal storage system plays signal into power amplifier 22 (e.g., MacIntosh Laboratory MC 7200) which is connected to the underwater transducer or other sound producing device (e.g., Actran Systems J-11 or Argotec, Inc. Model 220). A controller 30 provides means of selecting signal to be broadcast into the water and for actuating the delivery of the selected signal at the appropriate time to stun fish. The controller can, where appropriate, be remotely controlled, e.g., by seiner captain in a helicopter, so that stunning signals can be coordinated with other processes involved in fishing operation.

In a preferred embodiment of the invention, particularly when the target fish are tuna, the signal generator, recorder, or other source produces a train of square waves or a train of square waves that sweeps up and down in frequency in the range of 200–600 Hz. (see FIG. 12). The reason that a train of square waves or train of square wave that sweeps up and down in frequency are so effective is that they produce a variety of harmonics, as is shown in FIG. 12. In a school of fish there will be individuals with different ages. Since the otolith gets larger as the fish age, the resonant frequency of the otolith will change as well. Part of the reason the square wave is so effective is that it produces a range of odd harmonics that will cause otoliths of different sizes (in fish of different ages) to vibrate. Hence the square wave will stun all of the fish in the school, rather than just the fish of a particular age. The other advantage of the square wave is that it produces a very sharp or energetic wave front that causes a sharp displacement of the otoliths. An example of such a signal generator is a Tektronix Arbitrary Function Generator AFG 2020.

A band pass filter 23 placed before the power amplifier 22 prevents undesirable frequencies above and below the desired range, from the signal generator or tape recorder, from being passed into the amplifier. This ensures that the maximum amount of energy is used to reproduce the desired signal level of the desired signal wave form. Note that the band pass filter cannot prevent the transducer from producing odd harmonics, due to the nature of a square wave signal. Some harmonics may be desirable because of variations in otolith sizes in the fish, but higher and lower frequency harmonics could create problems. Therefore the actual signal introduced into the water by the transducer must be monitored with a hydrophone and signal analyzer. The harmonics are affected by the pulse rise time, decay time, and duration, and these characteristics can be adjusted to eliminate or reduce undesirable harmonics created by the square wave pulse.

A preferred filter is a Krohn-Hite Model 3550 variable filter set for band pass operation with low frequency cutoff set a 100 Hz and high frequency cutoff set at 10,000 Hz. This filter has an attenuation slope of 24 dB per octave.

An additional reason for eliminating high frequency harmonics, in the range above 10,000 Hz, is that dolphins are sensitive to such signals.

The filter also rejects lower frequency subharmonics or other low frequency signals that would otherwise reduce the power output of the transducer in the most desirable range of frequencies needed for stunning fish. A further advantage of cutting off low frequencies is that it prevents injection of signals into the water that might interfere with long-range communications between whales. Research has shown, for example, that certain baleen whales produce remarkably loud sounds, with their principal energy centered at frequencies near 20 Hz, and with a bandwidth of 3–4 Hz. For details, see Schevill. W. E., W. A. Watkins, and R. H. Backus, 1964. "The 20-cycle signals and Balaneoptera (Fin whales)." In *Marine Bio-Acoustics*, W. N. Tavolga, e.d., p. 147–152, Pergamon Press, New York; and Patterson, B. and G. R. Hamilton, 1964. "Repetitive 20 cycle per second biological hydroacoustic signals at Bermuda". In *Marine Bio-Acoustics*, W. N. Tavolga, ed., p. 125–146, Pergamon Press, New York. Further research has suggested that the 20 Hz signals produced by whales are propagated over great distances in the ocean. This can happen because of the existence of certain oceanic sound ducting phenomena, one of which is called the deep sound channel or SOFAR (SOund Fixing And Ranging) channel. Sounds radiated into this channel can travel great distances without the usual acoustic losses due to reflections from the water surface or bottom. Calculations indicate transmissions of 3,500 miles or more at 20 Hz in the deep-sound channel. Researchers have suggested that 20 Hz sounds are used by baleen whales to provide communication between members of a "range herd" that occupies the entire deep water range within a large oceanic region. For details, see Payne, R. and D. Webb, 1971. "Orientation by means of long range acoustic signaling in baleen whales". Annals of the New York Academy of Sciences 188:110–142. Setting the lower end of the transmission band of the filter to 100 Hz ensures that signals that could interfere with whale communication are not introduced by this invention.

With regard to the application of the device in the open ocean, with pelagic species, it is preferable to use transducers or other sound producing devices capable of producing sound pressures in excess of 150 dB re 1 µPa at 1 yd. As described above, it is necessary to overcome background noise produced by fish equipment and by the feeding frenzy of the fish and other predators.

Figure 3:
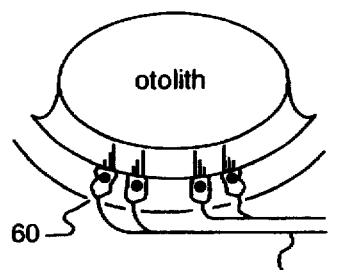
FIG. 3 shows the hearing organ of fish.

FIG. 3 shows the hearing organ of fish, which consists of calcarious granules known as otoliths that lie on a bed or macula composed of sensory hair cells connected to cranial nerves. Each otolith has a resonant frequency that depends upon its size, geometry, and composition. When a sound at the resonant frequency passes through the tissues of the fish, the otolith vibrates more strongly than the surrounding tissues, thereby creating periodic shearing forces at the macula and stimulating the sensory hair cells.

Figure 4:
FIG. 4 is a cross section of a fish otolith, showing annual growth rings, said otolith being from a 7 year old fish.

FIG. 4 shows the annual growth rings in an otolith from a 7 year old fish, the plaice, *Pleuronectes platessa*. Since the size and geometry of the otolith changes as the fish ages, individual fish within a school of tuna or other schoolfish consisting of fish of different ages will be predicted to have somewhat different hearing curves and different primary resonant frequencies of their otoliths.

Figure 5:
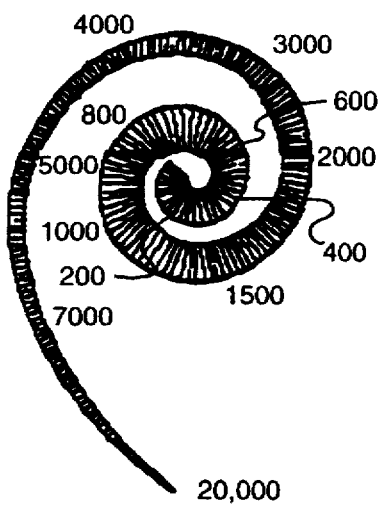
FIG. 5 is a drawing of the cochlea of the mammalian inner ear, with its tonotopic organization. The diagram shows the frequencies different parts of the cochlea are sensitive to in the human; a similar tonotopic arrangement is found in dolphins and other marine mammals, but the cochlea is absent in fish.

FIG. 5 shows the cochlea of the mammalian inner ear, with its tonotopic organization (meaning that sensory hair cells responding to different tones or frequencies are distributed topically or spatially along the spiral-shaped cochlea, low frequency responders being located at the inner or beginning part of the spiral and high frequency responders being located at the end or tip of said spiral). FIG. 5 shows the frequencies different parts of the human cochlea are sensitive to. A similar tonotopic arrangement is found in dolphins and other marine mammals. Fish have a more primitive hearing organ, lack a cochlea, and hence have an entirely different hearing mechanism relying on lateral lines and otolith granules attached to sensory hair cells within a labyrinth. The labyrinth in mammals, which represents an evolutionary advance over that in fish, is an organ of balance. It will be appreciated that the profound difference in sensory physiology in fish, as contrasted to marine mammals, provides a basis for a constructive application of this invention in the separation of tuna from marine mammals without causing harassment to the marine mammals.

Figure 6:
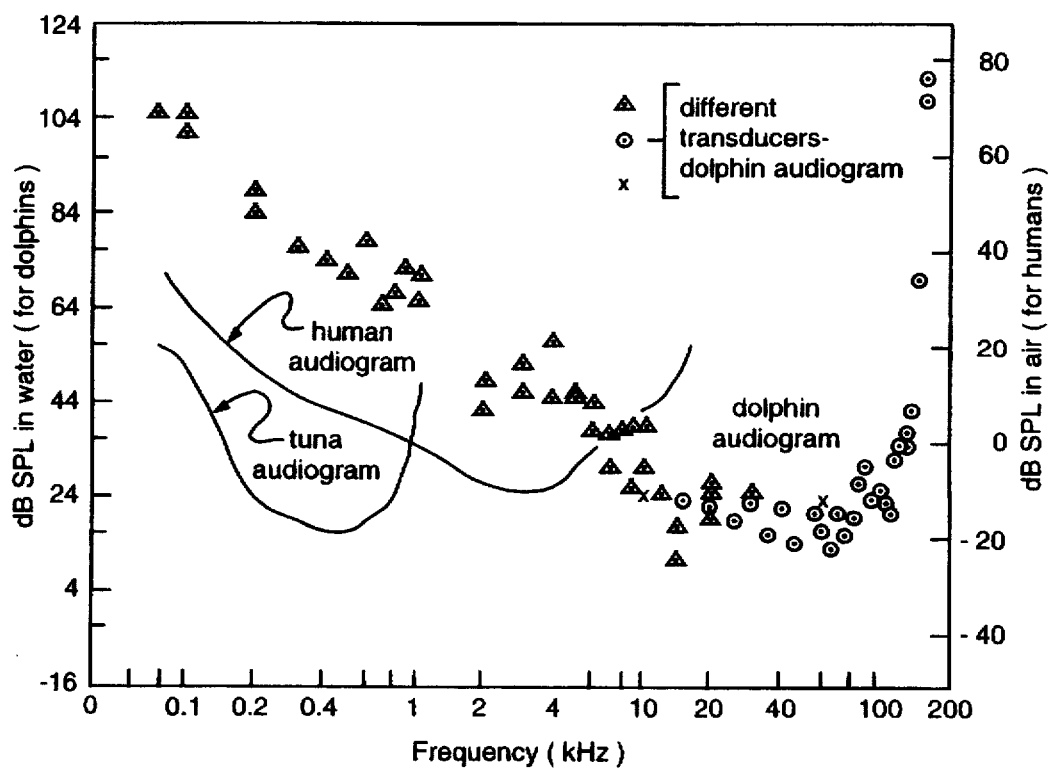
FIG. 6 shows is a set of hearing curves for human, dolphin, and yellowfin tuna, *Thunnus alabacares;*

FIG. 6 contrasts the range of fish hearing with that of man and dolphin. The places where the curves are lowest are the regions of maximum sensitivity, or lowest threshold, for sounds. Note that the peak sensitivity for the tuna is in the 400–600 Hz range, whereas the dolphin's peak is about 100 times that of the fish, or even greater than that value, or about 40,000 to 80,000 Hz. Human hearing lies between the fish and the dolphin, with maximum sensitivity occuring around 4000 Hz. Hence a strong signal around 400 Hz could be heard by a dolphin or by a human, but would sound very much louder to a tuna. For more detail, see Iversen, R. T. B. (1966) "Response of Yellowfin Tuna (*Thunnus albacares*) to Underwater Sound" In: W. N. Tavolga, Editor, "Marine Bio-Acoustics" Pergamon, Oxford, Vol. 2, p. 105–121; "Progress in 1964–1965 at the Bureau of Commercial Fisheries Biology Laboratory, Honolulu" 6–7; and Cahn, P. H., (1967) "Lateral line detectors" Indiana University Press, Bloomington, Ind. p. 226; the plots of human and dolphin responses are from Johnson, C. S. (1968) In "Marine Bio-Acoustics" Edited by W. N. Tavolga, Vol. 2, p. 247–260, New York, Pergamon. On the basis of these hearing response curves, signals for stunning tuna and other fish are selected in the 100 to 10,000 Hz range, as these signals will have maximum effect on fish while producing little or no effect on marine mammals. Again, the hearing curves are indicative of a profound difference in hearing mechanism in fish as compared to marine mammals such as dolphins. Absence of harmful effect on marine mammals is supported by the fact that the mammals appear to generate intense stunning sounds in this frequency range to debilitate prey, and these sounds do not appear to harm the marine mammals that generate the sounds.

Figure 7:
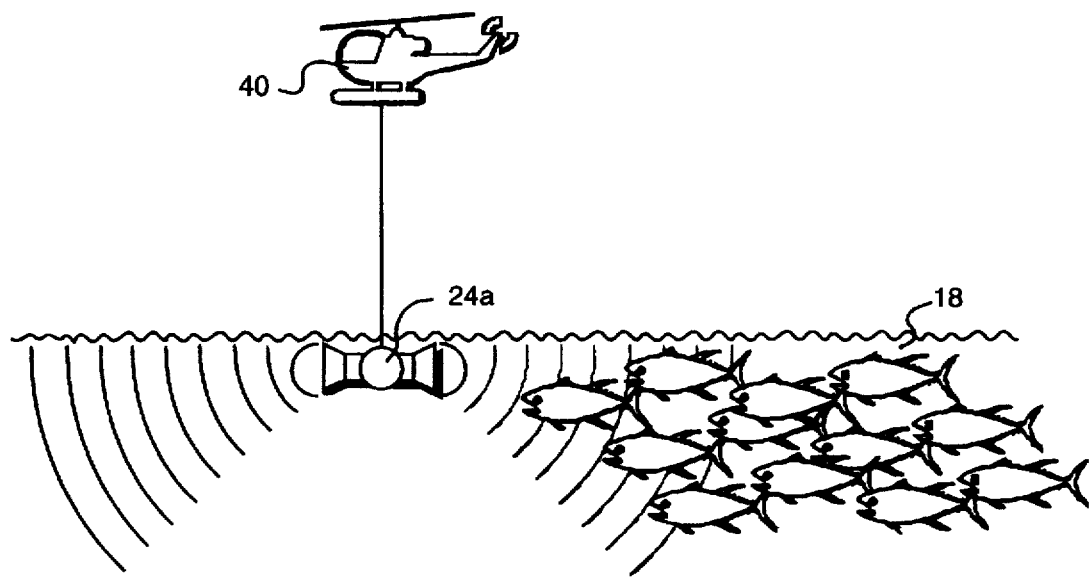
FIG. 7 illustrates an embodiment in which an omnidirectional transducer or other sound producing device is lowered or thrown from a helicopter into the water in the vicinity of a school of schoolfish such as tuna for injecting acoustic signals into the water to stun, disorient, or otherwise debilitate said schoolfish to facilitate their capture in nets.

FIG. 7 illustrates an embodiment in which an omnidirectional transducer or other sound producing device 24a (e.g., Actran System AJ15-3) is lowered into the water in the vicinity of a school of schoolfish 18 such as tuna for injecting recorded acoustic signals into the water to stun, disorient, or otherwise debilitate the schoolfish to facilitate their capture in nets. Pilot of a helicopter 40 or purse seine captain can activate system as needed to maintain state of disorientation of fish until nets have encircled fish and pursing is completed.

Figure 8:
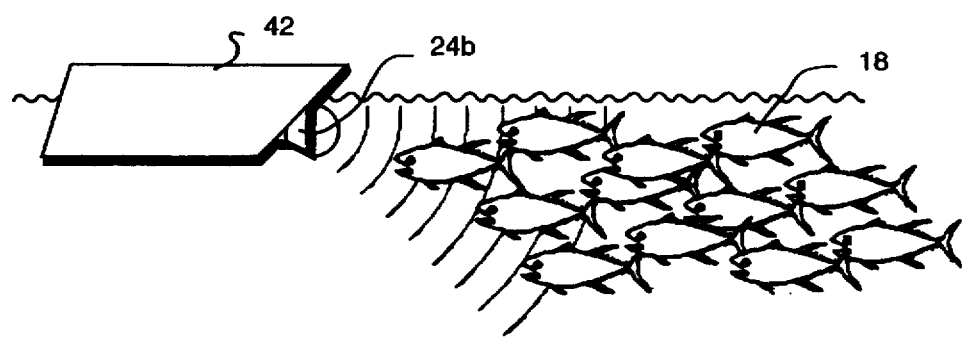
FIG. 8 illustrates an embodiment in which a transducer or other sound producing device carried (or towed) by a speedboat delivers acoustic signals in the vicinity of a school of schoolfish such as tuna in order to stun, disorient, or otherwise debilitate said schoolfish to facilitate their capture in nets.

FIG. 8 illustrates an embodiment in which the transducer or other sound producing device 24b is deployed from a speedboat 42 in the vicinity of a school of schoolfish 18 such as tuna for projecting acoustic signals into the water to stun, disorient, or otherwise debilitate said schoolfish to facilitate their capture in nets. The transducer or other sound producing device may be attached directly to the hull of the speedboat, or it may be towed behind and below the surface at different depths. In some applications it may be desirable to have the sound producing device even with or below the bottom of the net to prevent escape of fish under the net prior to pursing. Speedboat operator can activate system as needed to maintain state of disorientation of fish until nets 44 (see FIG. 9) have encircled fish and pursing is completed. Alternatively, purse seine captain can activate the system by remote radio control as needed to maintain control of movement of fish.

Figure 9:
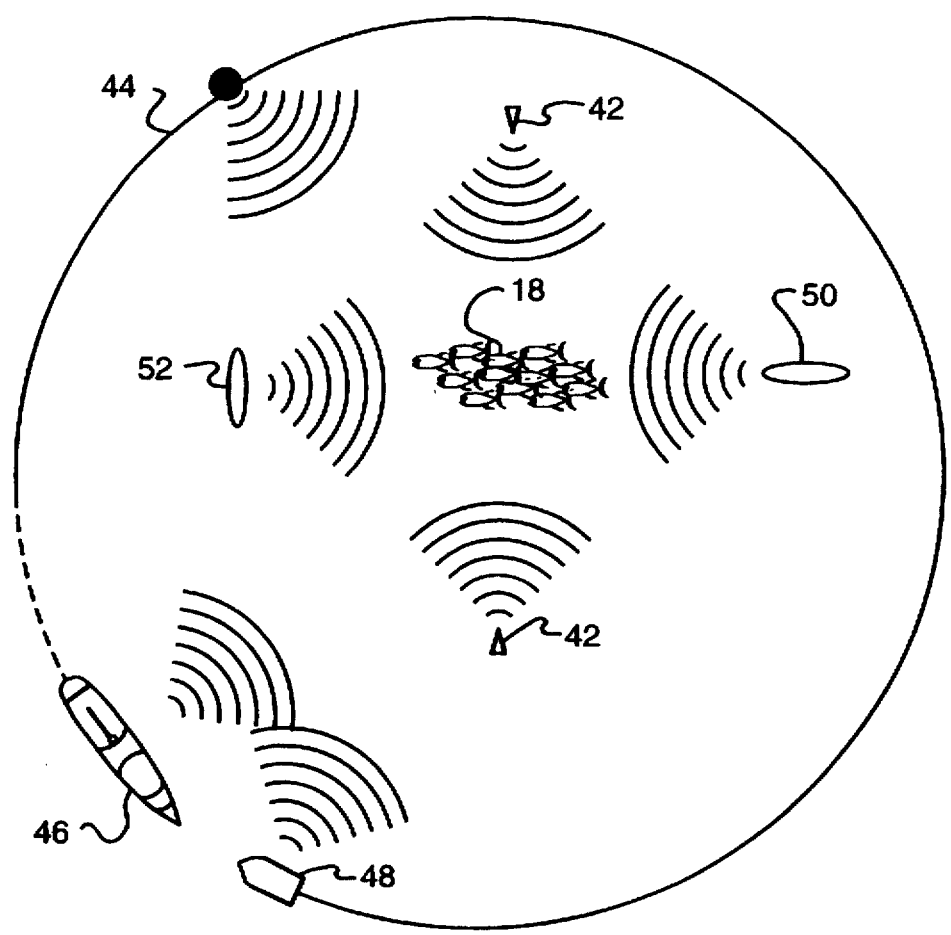
FIG. 9 illustrates embodiments for delivery of stunning signals from a variety of sources as needed to maintain the tuna or other schoolfish within the net prior to pursing or other capture means, said signals being delivered as needed from transducers or other sound producing devices located on speedboats, purse seiner, skiff, remotely operated vehicle (ROV), disposable or recoverable flotation device dropped from helicopter, or attached to the net.

FIG. 9 shows embodiments for the delivery of stunning signals from a variety of sources as needed to maintain the tuna or other schoolfish 18 within the net 44 prior to pursing or other capture means. The signals are delivered as needed from transducers located on speedboats 42, purse seiner 46, skiff 48, ROV 50, disposable or recoverable flotation device 52, or attached to net 44.

Figure 10:
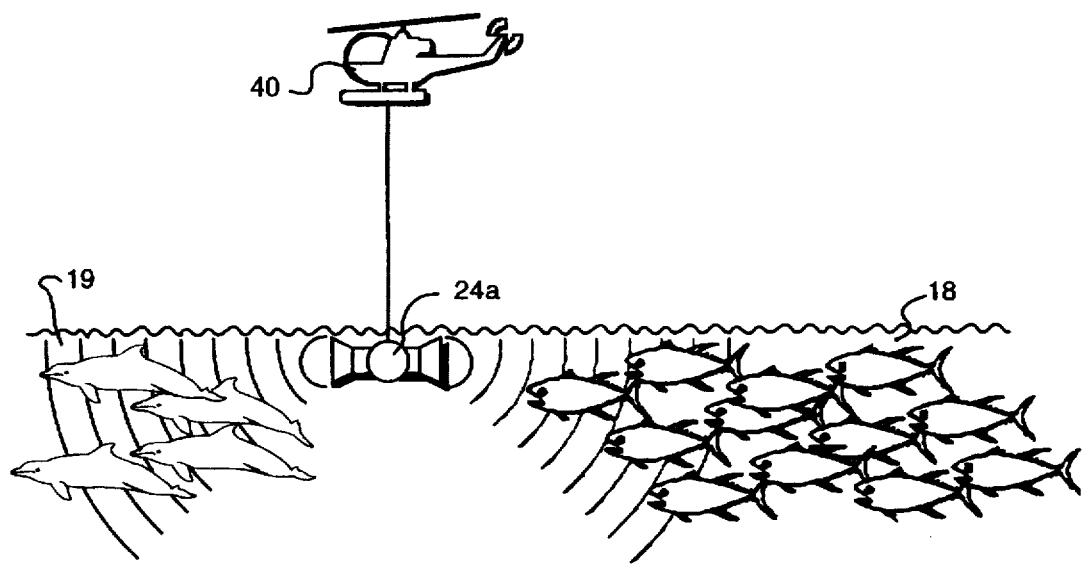
FIG. 10 illustrates an embodiment in which an omnidirectional transducer or other sound producing device is lowered from a helicopter into the water in the vicinity of a school of schoolfish such as tuna that are associated with dolphins or other marine mammals. The transducer or other sound producing device injects signals into the water to stun, disorient, or otherwise debilitate schoolfish to facilitate the capture of the fish and the escape of the marine mammals prior to net encirclement or other capture means.

FIG. 10 illustrates an embodiment in which an omnidirectional transducer or other sound producing device 24a is lowered from a helicopter into the water in the vicinity of a school of schoolfish 18 such as tuna that are associated with dolphins 19 or other marine mammals. The transducer injects signals into the water to stun, disorient, or otherwise debilitate schoolfish to facilitate the capture of the fish and to permit departure of the marine mammals prior to net encirclement.

Figure 11:
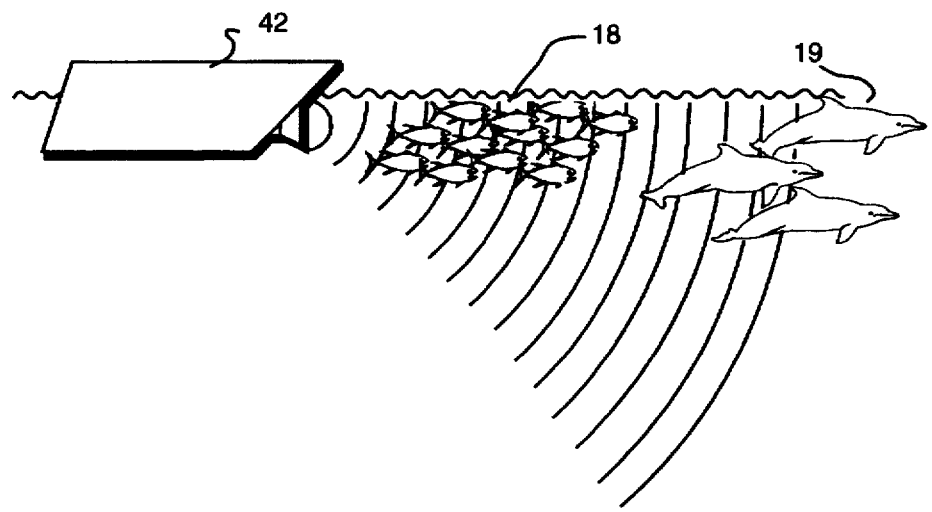
FIG. 11 illustrates an embodiment in which a transducer or other sound producing device carried by a speedboat delivers recorded signals in the vicinity of a school of schoolfish such as tuna in order to stun, disorient, or otherwise debilitate said schoolfish to facilitate their capture in nets and the escape of the marine mammals prior to net encirclement.
Figure 12A:
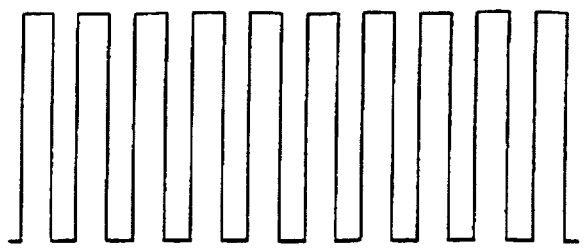
FIG. 12 illustrates two signals effective in stunning fish. The first is a train of 10 square wave pulses lasting a total of approximately 0.056 sec. The second is a train of 40 square waves that sweeps in frequency from 600 Hz to 200 Hz and back to 600 Hz. Spectra of these pulse trains shows presence of harmonics.
Figure 12C:
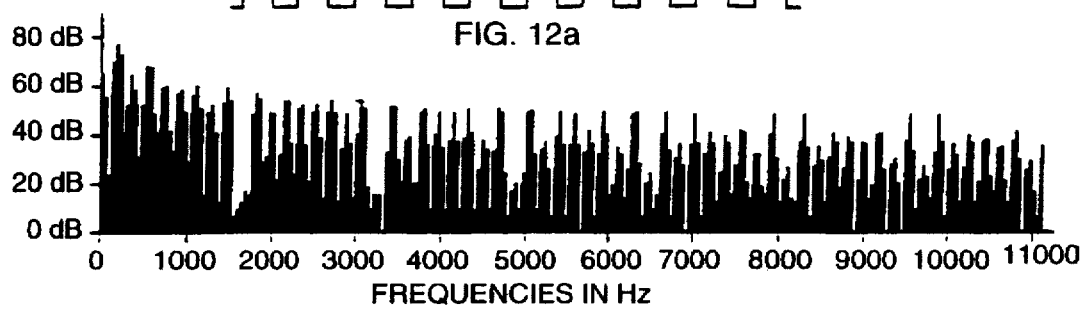
Figure 12B:
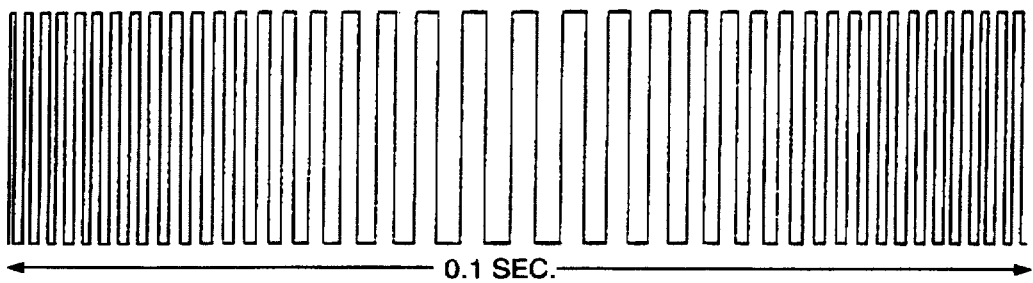
Figure 12D:
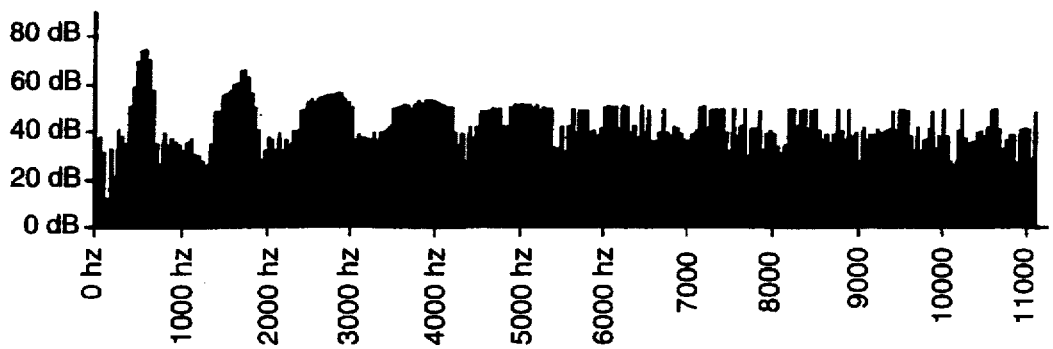

FIG. 11 illustrates an embodiment in which a transducer or other sound producing device 24b carried by a speedboat 42 delivers signals in the vicinity of a school of schoolfish 18 such as tuna in order to stun, disorient, or otherwise debilitate the schoolfish to facilitate their capture in nets and the departure of the marine mammals 19 prior to net encirclement.

FIG. 12 illustrates two signals effective in stunning fish. The first is a train of 10 square wave pulses lasting a total of approximately 0.056 sec. The second is a train of 40 square wave pulses that sweeps in frequency from 600 Hz to 200 Hz and back to 600 Hz. In both cases, spectral analysis shows the presence of harmonics.

While preferred embodiments of the present invention have been discussed above, it is to be understood that the disclosed embodiments are merely exemplary of the invention which may be embodied in various forms. Therefore, specific details disclosed herein are not to be interpreted as limiting, but merely as a basis for the claims and as a representative basis for teaching one skilled in the art to variously employ the present invention in virtually any appropriately detailed embodiment.

We claim:

1. Fishing apparatus comprising sound producing means for producing and acoustically broadcasting synthesized signals under water;

means for storing a group of signals predetermined by the steps of producing and acoustically broadcasting a group of synthesized signals under water to determine which of said group of signals has a frequency in a maximum range of stunning effect on a particular species and age of fish and minimal effects on marine mammals;

means for selecting at least one signal from said group of signals having a maximum stunning effect for a selected species of target school fish;

means for selectively activating said sound producing means with sufficient power that the broadcast underwater of the selected signal will temporarily stun a selected species of fish within range of said sound producing means.

2. The apparatus of claim 1, wherein the selected signals have a frequency less than 10 KHz.

3. The apparatus of claim 1, wherein the selected signals have a frequency between 200 and 800 Hz.

4. The apparatus of claim 1, wherein said activating means includes a sound generator and a controller.

5. The apparatus of claim 4, wherein said activating means includes a band pass filter to limit the frequency of signals entering the sound producing means to between 100 and 10,000 Hz.

6. The apparatus of claim 1, wherein said sound producing means includes an acoustic transducer.

7. The apparatus of claim 1, wherein said sound producing means is selected from the group of sound producing means including piezoelectric, magnetostrictive, flex-tensional, electrodynamic, moving coil, electrohydraulic, sparker, air gun, and other types of sound sources.

8. The apparatus of claim 1, wherein the signals comprise a series of square waves.

9. The apparatus of claim 8, wherein said activating means includes a band pass filter to limit the frequency of signals entering the sound producing means to between 100 and 10,000 Hz.

10. The apparatus of claim 8, wherein means are included for filtering and adjusting said square waves o project only those frequencies that stun adult fish, while not affecting sexually immature fish.

11. The method of netting a predetermined species of fish in the presence of marine mammals without harm to the mammals, producing and acoustically injecting synthesized signals underwater, said signals including a group of signals predetermined, by testing stunning effects of acoustical signals with said predetermined species, to have a frequency in a maximum range of stunning effect on a particular species and age or range of ages of fish and minimal effects on marine mammals, and acoustically injecting underwater said group of signals with sufficient sound pressure to stun the fish, temporarily stunning the fish and netting the stunned fish while the mammals are separated from fish.

12. The method of claim 11, wherein the mammals are allowed to proceed on a normal swimming course while the fish are partially immobilized by the sound signals so that the normal movement of the mammals soon separates the mammals from the fish.

13. Fishing apparatus comprising sound producing means for producing and acoustically injecting synthesized signals under water;

means for generating a group of signals predetermined by the steps of producing and acoustically injecting a group of synthesized signals underwater, to determine which of said group of signals have a frequency in a maximum range of stunning effect on a particular species and age of fish and minimal effects on marine mammals;

means for selecting at least one signal from said group of signals having a maximum stunning effect for a selected species of target school fish;

means for selectively activating said sound producing means with sufficient sound pressure that the injection underwater of the selected signal will temporarily stun a selected species of fish within range of said sound producing means.

14. The apparatus of claim 13, wherein said signals are a series of square waves that are swept over a range of between 200 and 600 Hz.

15. The method of preparing to net a predetermined species of fish in the presence of marine mammals without harm to the mammals, comprising the steps of producing and acoustically broadcasting a group of synthesized signals underwater, determining which of said group of signals has a frequency with a maximum stunning effect on said predetermined species and age or range of ages of fish and minimal effects on marine mammals, and recording said group of signals for subsequent acoustical injection with sufficient sound pressure to stun the fish temporarily so that the stunned fish can be netted while the mammals are separated from the fish.

16. The method of netting tuna in the presence of dolphins without harming the dolphins comprising the steps of producing and acoustically broadcasting synthesized signals under water, said signals including a group of square wave signals having a frequency range from 200 Hz to 600 Hz, which signals have a maximum stunning effect on tuna and minimal adverse effect on dolphins, said signals being broadcast with sufficient intensity to stun the tuna, and netting the stunned tuna while the dolphins are separated therefrom, any harmonics in the broadcast signals being limited to between 100 and 10,000 Hz.

17. Fishing apparatus for netting tuna in the presence of dolphins comprising sound producing means for producing and acoustically injecting synthesized signals under water;

means for generating a group of signals predetermined by the steps of producing and acoustically injecting a group of synthesized signals underwater, to determine which of said group of signals have a frequency in a maximum range of stunning effect on a particular species and age of fish and minimal effects on marine mammals;

means for selecting at least one signal from said group of signals having a maximum stunning effect for a selected species of target school fish;

means for selectively activating said sound producing means with sufficient sound pressure to temporarily stun the tuna within range of said sound producing means.

* * * * *